(12) United States Patent
Grady

(10) Patent No.: US 8,907,628 B2
(45) Date of Patent: Dec. 9, 2014

(54) AUTOMOTIVE BIPOLAR ELECTRICAL SYSTEM

(76) Inventor: John K. Grady, Harvard, MA (US)

( * ) Notice: Subject to any disclaimer, the term of this patent is extended or adjusted under 35 U.S.C. 154(b) by 950 days.

(21) Appl. No.: 13/020,842

(22) Filed: Feb. 4, 2011

(65) Prior Publication Data

US 2012/0200242 A1 Aug. 9, 2012

(51) Int. Cl.
*H02J 7/00* (2006.01)
*B60L 11/18* (2006.01)
*H02J 7/14* (2006.01)

(52) U.S. Cl.
CPC ........... *H02J 7/1423* (2013.01); *B60L 11/1864* (2013.01); *Y02T 10/7061* (2013.01); *Y02T 10/7005* (2013.01); *B60L 11/1853* (2013.01); *Y02T 10/648* (2013.01)
USPC ........................................... 320/119; 318/293

(58) Field of Classification Search
USPC ............................. 320/104, 119; 318/280, 293
See application file for complete search history.

(56) References Cited

U.S. PATENT DOCUMENTS

| | | | |
|---|---|---|---|
| 4,100,474 A | | 7/1978 | Pfeffer et al. |
| 4,672,294 A | | 6/1987 | Norton |
| 4,816,736 A | * | 3/1989 | Dougherty et al. ............ 320/116 |
| 5,528,122 A | * | 6/1996 | Sullivan et al. ............... 320/118 |
| 5,874,822 A | | 2/1999 | Navarro |
| 6,215,277 B1 | | 4/2001 | Renehan |
| 6,323,608 B1 | * | 11/2001 | Ozawa .......................... 318/139 |
| 6,713,928 B2 | | 3/2004 | Takizawa et al. |
| 6,930,404 B1 | | 8/2005 | Gale et al. |
| 7,352,154 B2 | * | 4/2008 | Cook ............................. 320/116 |
| 7,667,342 B2 | * | 2/2010 | Matsumoto et al. ......... 290/40 C |
| 7,935,086 B2 | * | 5/2011 | Lafferty, IV .................. 604/191 |
| 2007/0216452 A1 | * | 9/2007 | Matsumoto et al. .......... 327/116 |
| 2008/0171996 A1 | * | 7/2008 | Lafferty ........................ 604/187 |

OTHER PUBLICATIONS

Crouch et al., "Batteries for 42/14 Volt Automotive Electrical Systems", SEA International® Technical Papers, Aug. 21, 2000, Paper No. 2000-01-3065, Costa Mesa, CA.

* cited by examiner

*Primary Examiner* — Edward Tso
*Assistant Examiner* — Ramy Ramadan
(74) *Attorney, Agent, or Firm* — Donald S. Holland, Esq.; Holland & Bonzagni, P.C.

(57) ABSTRACT

Applicant has disclosed a method and apparatus for a bipolar automotive electrical system. In the preferred "apparatus" embodiment, Applicant's bipolar electrical system comprises: two (e.g., 12 V) batteries of equal, but opposite voltage (e.g., +12 V, −12 V), with bipolar outputs; an alternator, responsive to the batteries, which controls electrical charge to the batteries individually; an automotive DC motor connected by a single lead wire to the bipolar outputs from the batteries; and, wherein the reversible motor is run off the bipolar output without the need for any intervening devices between the bipolar command outputs and the motors. Alternatively, the alternator can inherently charge the batteries sequentially with the lowest voltage battery being addressed first. This approach allows heavy loads to be powered by 24 V or 48 V DC, yet the arc voltage to ground is still only 12 V or 24 V DC.

4 Claims, 3 Drawing Sheets

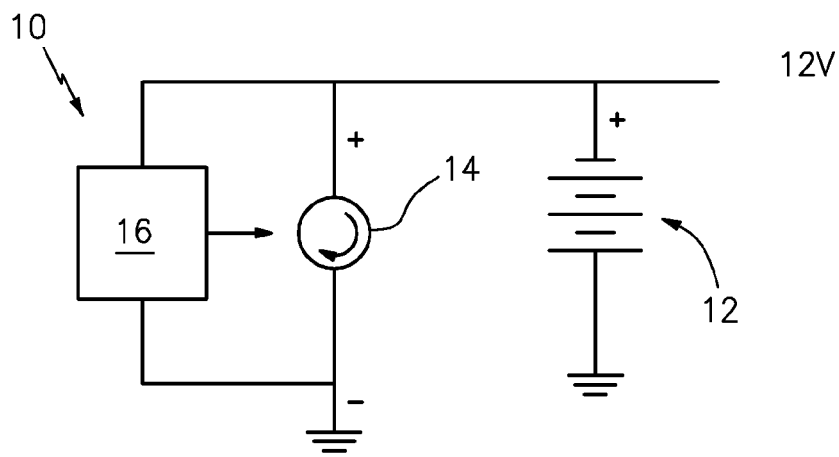
FIG. 1
(PRIOR ART)
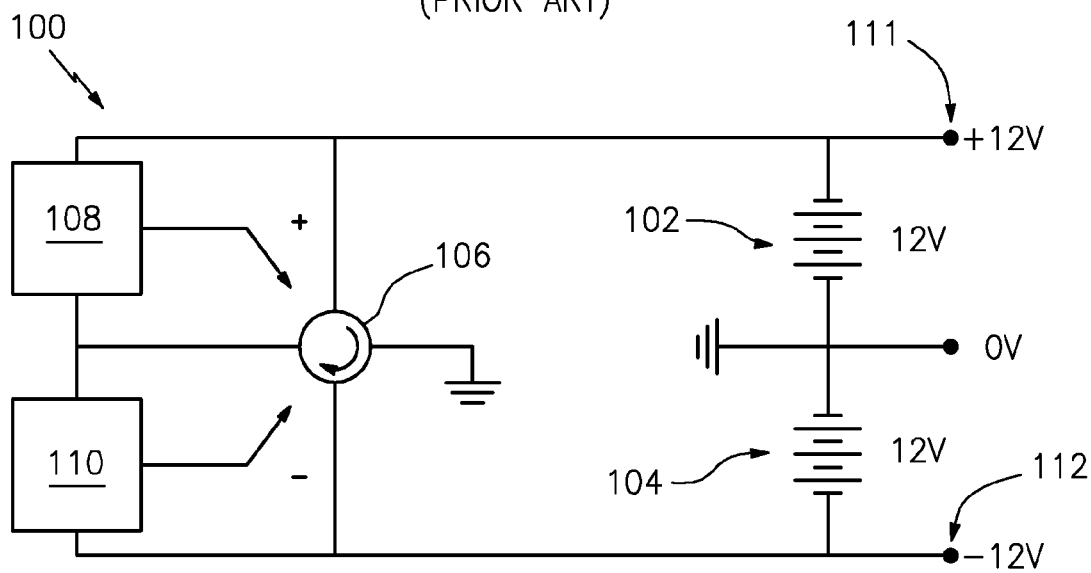
FIG. 2
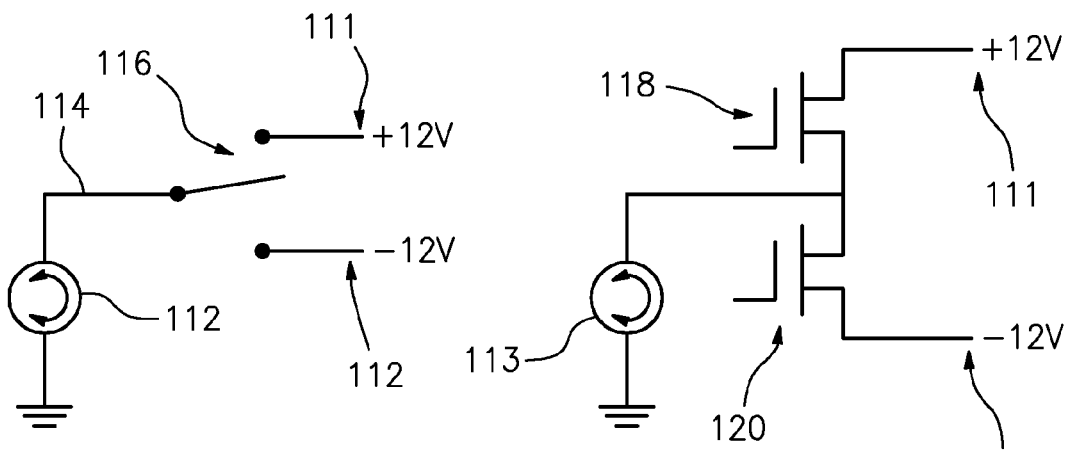
FIG. 3
FIG. 3A

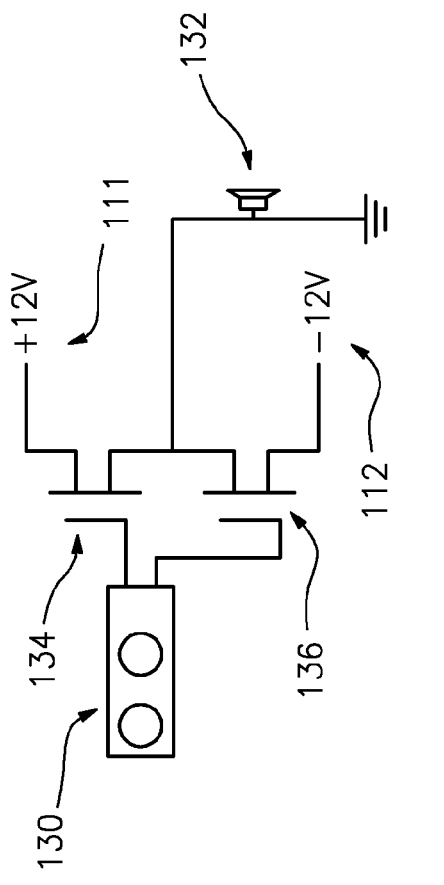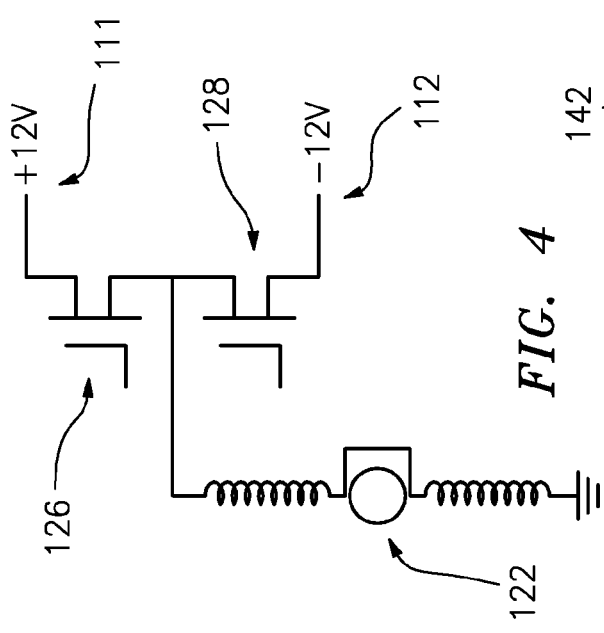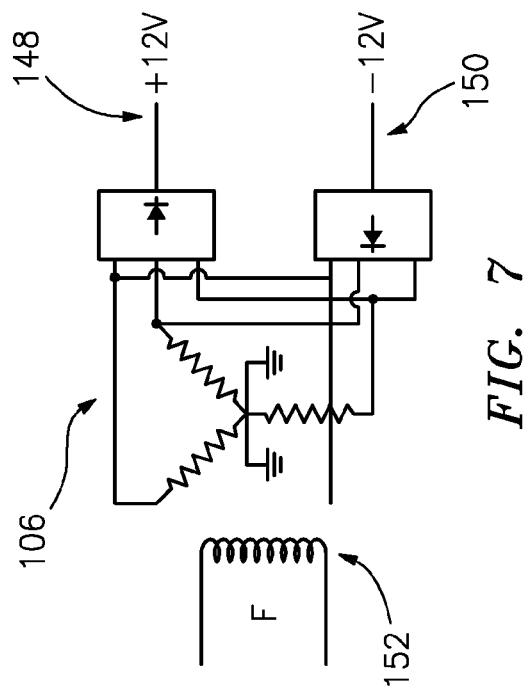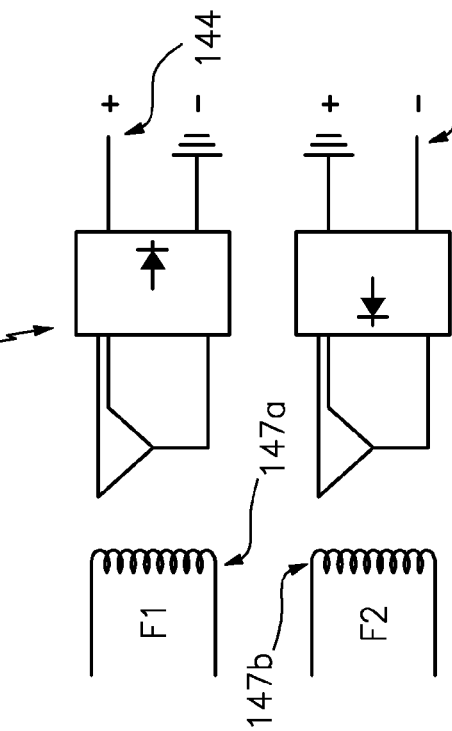

AUTOMOTIVE BIPOLAR ELECTRICAL SYSTEM

FIELD OF THE INVENTION

The present invention relates generally to power sources for vehicles and more particularly to electrical distribution systems to power automotive devices and systems.

BACKGROUND OF THE INVENTION

There has been growing dissatisfaction with the 12-volt battery currently used to power most automotive devices. Primarily there are two concerns: (a) the size of connected loads to the battery will grow in the future, e.g., with: (i) electric automotive air conditioning; (ii) using an electric motor to assist in acceleration and/or to actually launch a vehicle; (iii) high-power solid-state starting systems to enable "engine off" operation when stopped (i.e., to eliminate idling time); and (b) the difficulty of achieving high power, 1 HP or more at 12 V using semiconductors, due to heavy currents and the resulting high losses, especially when a semi-conductor bridge configuration is required (e.g., two active power devices in series, at currents of 75 A or more).

Other rather obvious problems also exist as desired power rises: (i) high cost of copper due to wire size at 75-100 Amperes; and (ii) the inefficiency of high powered alternators at low voltages, again due to series diode semiconductors in the power rectifiers they contain. In fact, automotive alternators over about 1.5-2.0 kW tend to be comprised of two alternators in parallel in one housing due to this inefficiency of high powered alternators, or water cooled (e.g., the 120 A or 150 A Bosch® alternators).

The Society of Automotive Engineers ("SAE") Journal "Automotive Engineering" has had ongoing articles and even has described devices for the upcoming "42 Volt automotive electric system." For example, see "Batteries for 42/14 Volt Automotive Electrical Systems" by Dell A. Crouch and Gary L. Ballard, published on Aug. 21, 2000.

The 42 V capacity (i.e., a 250% increase over current automotive batteries) was initially advocated by some to address the above problems. However, actual implementation of the idea has been "pushed back" year after year. This delay has happened for very good reasons, as some experienced individuals have looked at the drawbacks of such a system. The initial optimism has turned to confusion, although the advocates of 42 V do not see it that way.

Even with the 42 V approach, there are anticipated problems. For example, Applicant extrapolates that the battery for 42 V, if 42 is taken nominally as is 12 in 12 V batteries, requires 21 cells. This many cells in series poses a reliability problem as any slight difference in materials, or especially electrolyte quantity loading, or contamination will cause any one cell either to be better or worse than its neighbors in terms of exact Ah (i.e., battery capacity). This may lead to under- or over-charging of a cell compared to its neighbors, as the battery is cycled, leading to early failure of one cell out of the 21 cells.

This problem was severe when 12 V batteries first appeared in the mid 50's. The then-proven 6 V battery had three large cells, and was more forgiving of slight imbalances. However, for the first five years or so of 12 V battery use, "dead cells" were very common. As time passed, manufacturers achieved better matching, and this problem was essentially solved; but this was for six cells each about ½ the volume of the three-cell 6 V battery; a 21-cell battery will have about ⅛ the volume per cell of the 6 V type, so the sensitivity will be far higher to these problems. This history must not be dismissed.

It should be noted that 6 V, 12 V or 42 V batteries for an automobile will all hold about the same kWh, or energy total, and weigh about the same. The individual cell volume, however, decreases directly with voltage increase. The number of cells goes up, at the known rate of 2 V per cell, as voltage increases. That means more cells, smaller due to the same space constraints.

A 21-cell automotive battery will thus have small cells, and lots of them. It is expected those two negative trending facts will be multiplicative, and that the cell matching problem will reappear. Note that it takes only one cell to destroy the entire battery, even if the other 20 are in fine shape. There is a statistical aspect to this: the chances of a bad battery will be higher than just the linear aspect of more cells. Further, the cells are only about ¼ as large as a normal 12 V cell. Yet, they still will have to endure heavy currents more often than today, due to increased expectations such as the starting cycle at every stop; thus, the cells will fail more often.

Another problem with the multi-cell battery is that the charge systems in use, and envisioned for 42 V, can typically only make decisions by looking at the end voltage or terminal voltage. The multi-cell battery will stop a charge early if one or two cells cannot accept full charge, and thus are at a high voltage too early, even as the other cells are not yet charged. More elaborate charging systems (e.g., that monitor each cell) would help this, but they are prohibitively expensive, and make tapping each battery cell a necessity.

Last, for a given battery weight or physical size, more of the battery (with many cells) will be plastic cell separators and conductive cell connectors, rather than actual active material cell volume. One would expect the battery to be less efficient at storing energy per unit volume than a 12 V battery, yet cost far more to manufacture for the same kWh.

These problems are well known in the 48 V electric fork truck business, where the individual cells are much larger than the 12 V cell typical of automotive use. Most routine users of forklifts have encountered a bad battery. High voltage batteries comprised of many cells fail often.

Experience in the x-ray business highlights the same problems, with the batteries in portable x-ray units (e.g., the AMX® line by General Electric Company); three or four companies came into existence trying to solve battery problems with that x-ray unit, a 120 V array of batteries that constantly fail due to cell mismatch Several potential hazards with unipolar 42 V batteries must be considered. For example, the 42 V battery provides energy well over that needed to sustain an "arc weld" type of electric arc. Any faults will tend to grow rapidly to major damage or fire, as fault currents will be hundreds if not thousands of amperes of DC at 42 V, which exceeds the values normally used for arc welding.

This will require large size, fast fuses; careful mechanical protection of cables; and added insulation. Yet the hazard still will exist, as when servicing the car, or in accidents.

Switching heavy DC currents at 40 V or more is problematic, since relays will need special materials, arc chambers or magnetic "blowouts", when the current is higher than about 25 A. At less than 25 A, arcing of contacts in switches or relays is still a major problem, especially with inductive loads. For example, a commercial relay from OMRON Corporation for 200 A DC at these voltages costs $300.

Other commercial issues arise. For example, a 12 V subsystem still will be needed, as many automotive systems and devices are well developed and of reasonable cost at 12 V, such as power windows, radios, lighting. Accordingly, SAE expects initial applications of 42 V to also have a 12 V system, and possibly a 12 V battery as well as the 42 V battery. This leads to complex expensive topologies, involving DC/DC converters between the two systems to charge the 12 V systems. That will be an unworkable approach from a cost perspective, as its cost per automobile will be double (at least) any 12 V system.

The 42 V system is designed with one side grounded. Although the 42 V has been advocated primarily by solid-state engineers as being optimal for power semiconductors, a grounded system still will require an "H" bridge power stage configuration, or two semiconductors in series in each switching position, due to the grounded unipolar supply.

The optimal ideal automotive electrical system ought not to be driven only by one facet, the use of power semiconductors. It ought to be driven by a careful analysis of all the components and the topologies needed to employ them, as well as new hazards, and the battery issue.

Prior to semiconductors, circa 1912, engineers obtained several horsepower from 6 V batteries to start internal combustion engines, which demonstrates that voltage alone is not the limitation it appears to be.

U.S. Pat. No. 4,100,474 to Pfeffer et al. discloses a dual voltage which continues to use a common earth polarity for both voltages. Therefore, it does not allow bipolar operation. The same unipolar operation is true of U.S. Pat. No. 4,672,294 to Norton; Norton uses a series connection to achieve 24 V.

U.S. Pat. No. 5,874,822 to Navarro discloses an alternator construction with up to five windings to charge multiple batteries at the same time. Navarro does not address bipolar connection or bipolar charging; the intended alternator improvement is addressed toward very high outputs at any useable DC voltage, but particularly 12 and 24 V. Bipolar operation is not described.

U.S. Pat. No. 6,215,277 to Renehan discloses methods to charge two batteries of differing voltages of the same polarity from a single alternator. It does not disclose bipolar use.

U.S. Pat. No. 6,713,928 to Takizawa et al. discloses an alternator construction. That construction is specific to alternator mechanical design irrespective of electrical connections. Takizawa shows two sections in parallel to allow high output at one voltage.

U.S. Pat. No. 6,930,404 to Gale et al. ("Gale '404") discloses the use of two 12 or 42 volt batteries which are charged in parallel by his switch SW1, SW2 and then switched to a series connection (i.e., 24 V) by a controller (i.e., element 41 in Gale's drawings). Gale's intent apparently is to provide 24 V or 84 V for a short period; for instance, while starting a car. The batteries return to 12 V or 42 V after the 24 V or 84 V operation is completed.

Gale describes many ways to charge and actively switch or use two batteries by control means, including various DC/DC converters, series parallel switching relays, or solid state devices, and boost converters.

Accordingly, it is a primary object of the present invention to greatly simplify the two battery concept described in Gale '404 by requiring no power switching, DC/DC converters or boost converters.

It is a more specific object to provide two batteries simply charged individually, permanently connected in bipolar and with a bipolar alternator, and used to power loads individually (with the batteries in series) without any intervening control means.

It is another object to provide a related method to power reversible DC motors.

SUMMARY OF THE INVENTION

Applicant has disclosed a bipolar automotive electrical system comprising two standard 12 V batteries which are centered grounded, so that +12 V and −12 V are available. This allows heavy loads to be powered by 24 V DC, yet the arc voltage to ground is still only 12 V DC. Each battery is separately charged and controlled. This approach keeps the normal, reliable and cost effective 12 V battery, now in high volume production.

Applicant has also disclosed a related method to power DC motors.

In a preferred "apparatus" embodiment, Applicant's bipolar automotive electrical system comprises: (a) two batteries of equal but opposite voltage, with the center tap grounded (preferably to the automobile frame); (b) one alternator, responsive to either battery, which controls electrical charge to the batteries individually, either inherently or actively; and (c) a reversible automotive DC motor, with a single lead wire, connected by at least one switch to bipolar outputs from the batteries. Alternatively, the alternator can inherently charge the batteries sequentially with the lowest voltage battery being addressed first.

BRIEF DESCRIPTION OF DRAWINGS

The above and other objects will become more readily apparent when the following description is read in conjunction with the accompanying drawings, in which:

FIG. 1, labeled "Prior Art", shows a standard unipolar electrical system for an automobile;

FIG. 2 depicts a preferred embodiment of Applicant's "Bipolar Automotive Electrical System";

FIG. 3 shows Applicant's preferred "Automotive Bipolar Electrical System" used to power a typical small DC motor in an automobile;

FIG. 3A shows the alternate use of solid state switches instead of a electromechanical switch depicted in FIG. 3;

FIG. 4 shows Applicant's "Automotive Bipolar Electrical System" used to power an AC motor in an automobile;

FIG. 5 shows a bipolar radio in an automobile;

FIG. 6 shows a dual alternator with bipolar outputs;

FIG. 7 shows a bipolar alternator with dual outputs; and

DETAILED DESCRIPTION OF PREFERRED EMBODIMENT(S)

Figure 8:
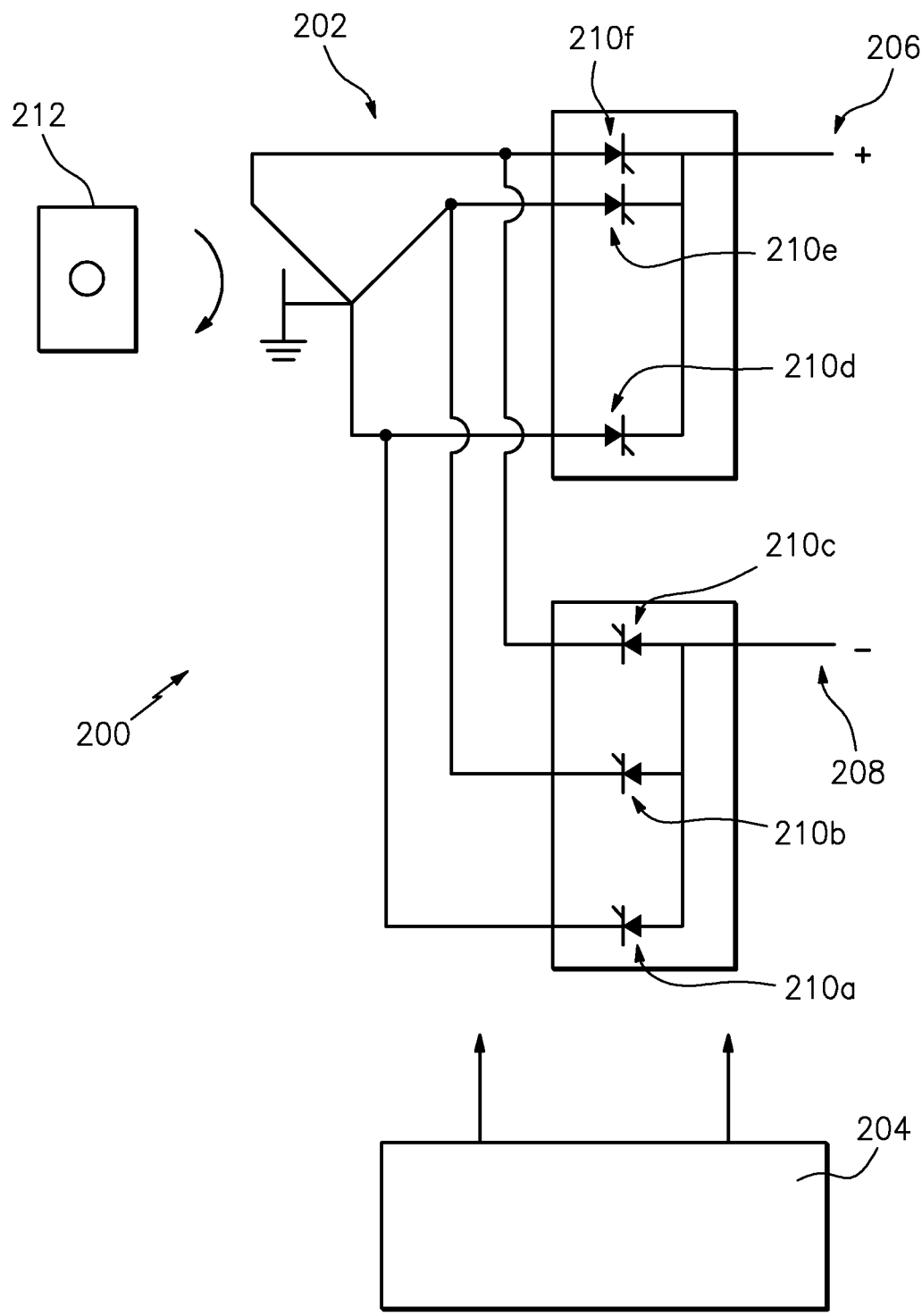
FIG. 8 shows a permanent magnet alternator with an independent plus and minus charge control.

FIG. 1, labeled "Prior Art", shows the common automotive electrical system 10 comprising: a single 12 V battery 12 electrically connected to an alternator 14 and a voltage control 16. It is unipolar.

Referring to FIGS. 2-8 in detail, Applicant has disclosed a "Bipolar Automotive Electrical System", both in apparatus and method form.

Applicant's invention can be thought of broadly, in "apparatus" terms, as a bipolar electrical system comprising an electrical circuit having: two (e.g., 12 V) batteries (e.g., 102, 104) of equal, but opposite voltage (e.g., +12 V, −12 V), in bipolar; a bipolar alternator (e.g., 106), with two opposite voltage outputs (i.e., plus and minus), responsive to the batteries (e.g., 102, 104) and controlling electrical charge to the batteries individually; two voltage controls (e.g., 108, 110), separately charging the two batteries (e.g., 102, 104); and wherein bipolar DC outputs (e.g., +12 V, −12 V) at 111, 112 from the batteries (e.g., 102, 104) (in series) are used to power loads individually (with the bipolar batteries in series) without the need for any intervening control between the loads and the bipolar DC outputs.

Applicant's preferred "apparatus" embodiment is a bipolar electrical system 100 comprising an electrical circuit having: two (e.g., 12 V) batteries 102, 104 of equal, but opposite voltage (e.g., +12 V, −12 V), connected in bipolar; a bipolar alternator 106, with two opposite voltage outputs (i.e., plus and minus), responsive to the batteries 102, 104 and controlling electrical charge to the batteries individually; two voltage controls 108, 110, separately charging the two batteries 102, 104; and wherein bipolar DC outputs (e.g., +12 V, −12 V) at 111, 112 from the batteries 102, 104 (in series) are used to power at least one reversible motor (see, e.g., FIG. 3) without the need for any intervening control means.

FIG. 3 discloses a one-wire simple control of a typical small reversible motor 113 used throughout an automobile. The one wire 114 is connected by a single-pole double-throw switch 116 depicted to the bipolar outputs of Applicant's bipolar electrical system. Such motors are used to drive various devices such as power windows and power seats.

Two solid state switches 118, 120 could be substituted instead for switch 116, if desired. See this alternative embodiment in FIG. 3A.

FIG. 4 shows an AC motor 122 with a single wire control 124 having solid state switches 126, 128 connected to the bipolar outputs (+12 V, −12 V) at 111, 112 of Applicant's preferred embodiment 100. This illustrated single phase can be expanded to multi phase motors, stepper motors (not shown) or multiple motors (not shown) using one half the usual number of solid state switches and wires.

FIG. 5 shows a bipolar car radio, or audio amplifier, 130 with a grounded speaker 132, connected via solid state switches 134, 136 to the bipolar outputs 111, 112 of Applicant's preferred embodiment 100. One illustrated wire can be connected to one or more high output speakers (e.g., 2 ohm speakers).

FIG. 7 shows a Y bipolar alternator 106, grounded center, with dual outputs at 148, 150 (+12V, −12V). It forms part of Applicant's preferred bipolar electrical system 100, shown in FIG. 2. This alternator can charge the batteries 102, 104 sequentially with the lowest voltage battery being addressed first. It can be self balancing inherently.

An automotive alternator (like 106) is a three-phase generator with a built-in rectifier circuit consisting of six diodes. As the alternator's sheave or pulley is rotated by a belt connected to the automobile engine's crankshaft, a magnet is spun past a stationary set of stationary three-phase windings (i.e., the stator) usually connected in a delta or "Y" configuration (as in FIG. 7). The spinning magnet is actually an electromagnet, not a permanent magnet. Alternators are designed this way so that the magnetic field strength can be controlled, in order that output voltage may be controlled independently of rotor speed. This rotor magnet coil (i.e., the field coil) is energized by battery power (e.g., from Applicant's bipolar output) so that it takes a small amount of electrical power input to the alternator to get it to generate the desired level of output power.

In FIG. 7, a rotor magnet's field coil is depicted at 152, controlled by a voltage regulator.

FIG. 6 shows an alternative alternator 142—a dual alternator on one rotatable shaft (not shown). The alternator 142 has bipolar outputs at 144, 146. Two magnets' field coils are depicted at 147a, 147b, allowing individual control of the outputs.

FIG. 8 shows an alternative alternator 200—a permanent magnet alternator which can also be used as a motor—with an independent plus and minus charge control 204 implemented in the power output leads 206, 208. This depicted alternator 200 has silicon controlled rectifiers (SCRs) 210b, 210c, 210d, 210e, 210f, but any suitable power semiconductor can be used. The permanent magnet is depicted at 212. Though not shown, it may have many poles.

This logic follows that of the Edison system of the 1870's, and for similar reasons. Edison found that he could transmit 110 V power four times as far by essentially canceling the drop in the return wire by having another 110 V load of opposite polarity connected to the same return wire. Essentially 110 V loads are served with drops typical of 220 V circuits. As a given power transmitted at 220 V versus 110 V will only require ½ the current, any resistance drops are also cut in half; so for the same drop or power loss in percentage, an Edison connection can go 4 times as far. This system is still the standard world-wide for utilities.

Some immediate advantages of Applicant's bipolar automotive electrical system are set forth below in Paragraphs [0058]-[0063]:

All DC automotive motors, which are reversed rotationally in their normal application, will now need only one wire and are of conventional DC permanent magnet motor design, as plus or minus voltages are available. This includes such applications as power seats or power windows. (The modern car may have 20 or 30 such motors or actuators.) This approach eliminates all two wire feeds or local "control Printed Circuits" where such motors are now used, and it eliminates motors of special design, such as split DC field. For all small reversing motors, they will be immediately smaller, more efficient and cost less. One wire per motor reduces cost.

The switches for such DC motors will be a simple single pole, double throw configuration (like switch 116). Currently, complex six-terminal reversing switches or relays are needed to reverse DC motors, or a special field lead (e.g., two or more wires to each motor).

The automotive harness size is reduced significantly, as is the cost and number of connector pin outs. This is offset somewhat by the plus and minus supplies, but those leads do not extend to all the accessories; they are only the main power wires.

The majority of all fractional horsepower, semiconductor controlled reversible motion (or actuators) will require only two power devices instead of the "bridge" of four, and circuitry to drive four, a great savings in devices and efficiency. Likewise, small single phase AC motors driven from bipolar DC supplies would need only two power switch devices.

The radio can have over 140 watts RMS (i.e., root mean square) audio output per speaker with a 24 V bridge with no FET (i.e., field-effect transistor) DC/DC inverters needed to increase radio output voltages (e.g., 4 ohm speaker, 24 V=6 A or 144 Watts). One wire grounded 4 ohm speakers can exceed 35 Watts, without a bridge. With multi-speaker systems savings are significant and cumulative.

24 V, high power three-phase bridge drivers can readily start the engine repeatedly, or power an alternating current air conditioning compressor. This concept can be extended to a 24/48 V version.

Applicant's preferred bipolar system uses proven 12 V batteries, and 12 V wiring experience, switches and parts. A special alternator is required. It can be based on existing "two in one" designs (e.g., the Bosch® Alternator 120 A), or redesigned, with tracking outputs to primarily charge the lowest voltage battery first, until both are equal. This can be an inherent characteristic of a six-phase Y connected alternator, with the Y point center grounded, where the added new six-phase configured windings on each diametrically opposite phase leg around the Y point are on the same iron core as the original three-phase windings.

Unlike Applicant's invention, there is no provision in U.S. Pat. No. 6,930,404 to Gale et al. (cited in Applicant's "Background" section) to charge a battery directly by an alternator, upon the alternator having been switched to the 24 V or 84 V position. Gale depends on various forms of DC/DC converters and active switching of modes. No mention is made in Gale of permanently connected and charged +12 and −12 supplies.

Complexity will be greatly reduced with Applicant's invention. The number of semiconductor power switching devices in the automobile is cut in half by the new concept, for the majority of the envisioned applications.

Applicant's invention can be thought of broadly as a method of powering an internal combustion automobile electrical system, comprising:
   a. connecting two batteries of equal, but opposite, voltage in an electrical circuit with bipolar DC outputs with respect to a center terminal that is grounded; and
   b. connecting at least one alternator, in the circuit, to the batteries to control electrical charge to the batteries.

Additional narrower steps can include:
   a. connecting a reversible automotive DC motor to the bipolar DC outputs;
   b. running the motor in one direction by a DC current produced by a positive voltage from one of the batteries;
   c. subsequently running the motor in a reverse direction by a DC current produced by a negative voltage from another of the batteries;
   d. wherein the motor is run off the bipolar DC outputs without the need for any intervening control between the motor and the outputs; and
   e. the motor has only one lead wire.

It should be understood by those skilled in the art that obvious structural and process modifications can be made to the Automotive Bipolar Electrical System without departing from the spirit of the invention. For example, each battery could be 24 V rather than 12 V. Accordingly, reference should be made primarily to the accompanying claims rather than the foregoing description to determine the scope of the invention.

I claim:
1. A method comprising:
   a. connecting two 12 volt batteries of opposite voltage in an electrical circuit, of an internal combustion automobile, with bipolar DC outputs, with a center tap grounded;
   b. connecting a reversible automotive DC motor to the bipolar DC outputs;
   c. running the motor in one direction by a DC current produced by a positive voltage from a first battery of the two batteries without any control, in the electrical circuit, between the first battery and the motor;
   d. subsequently running the motor in a reverse direction by a DC current produced by a negative voltage from a second battery of the batteries without any control, in the electrical circuit, between the first battery and the motor; and
   e. connecting at least one alternator, in the circuit, to the batteries to control electrical charge to the batteries.

2. The method of claim 1 wherein the at least one alternator controls electrical charge to the batteries individually.

3. The bipolar electrical system of claim 1 wherein the at least one alternator charges the batteries sequentially with a lowest voltage battery being addressed first.

4. A method comprising:
   a. connecting two batteries of opposite but equal voltage in an electrical circuit, of an internal combustion automobile, with bipolar DC outputs;
   b. connecting a reversible automotive DC motor to the bipolar DC outputs;
   c. running the motor in one direction by a DC current produced by a positive voltage from a first battery of the two batteries without any control, in the circuit, between the first battery and the motor; and
   d. subsequently running the motor in a reverse direction by a DC current produced by a negative voltage from a second battery of the batteries without any control in the circuit between the first battery and the motor.

* * * * *